3,427,279
NITROGEN TETROXIDE RESISTANT CARBOXY-
NITROSO TERPOLYMER
Joseph Green, Dover, Nathan B. Levine, Colonia, and
William R. Sheehan, Hopatcong, N.J., assignors to
Thiokol Chemical Corporation, Bristol, Pa., a corporation of Delaware
No Drawing. Filed June 14, 1966, Ser. No. 557,357
U.S. Cl. 260—41  9 Claims
Int. Cl. C08g 45/04; C08f 45/72, 15/40

ABSTRACT OF THE DISCLOSURE

An elastomer which is resistant to attack from nitrogen tetroxide is obtained from a carboxy-nitroso terpolymer polymerized from a mixture of trifluoronitrosomethane, gamma-nitrosoperfluorobutyric acid and tetrafluoroethylene monomers by curing the terpolymer with dicyclopentadiene dioxide curing agent. The resulting cured elastomer, which can include fillers, is a solid rubbery material which can be shaped for use as a sealant or gasket and the like.

---

This invention pertains to epoxy-cured nitroso rubber. More particularly, this invention relates to nitroso terpolymers cured with dicyclopentadiene dioxide.

Nitrogen tetroxide is an energetic oxidizer widely used in rocket propellants. Although materials suitable for seals, gaskets, flexible connectors, bladders and insulators are needed for applications involving contact with this oxidizer, many of the conventionally-employed elastomers have proved to be especially susceptible to nitrogen tetroxide attack, and lose strength and elasticity after short exposure thereto. In attempts to provide elastomers that are resistant to nitrogen tetroxide, researchers have synthesized and tested numerous polymers, including terpolymers comprising trifluoronitrosomethane, gamma-nitroso-perfluorobutyric acid, and tetrafluoroethylene, hereinafter referred to as carboxy-nitroso terpolymers for convenience. It is also to be understood that the term "carboxy-nitroso terpolymer," as used in claims appended hereto, refers to the aforementioned terpolymers. Various materials have been investigated as curing additives for carboxy-nitroso terpolymer. Carboxy-nitroso terpolymer cured with chromium trifluoroacetate is resistant to nitrogen tetroxide. However, tests of carboxy-nitroso terpolymer cured with chromium trifluoroacetate have shown that the terpolymer has a compression set as high as 80% (i.e., after compression, followed by release, the material returned only 20% toward its original shape). In contrast, it has been found in accordance with the invention that when carboxy-nitroso terpolymer is cured with dicyclopentadiene dioxide, the compression set was 27% and the vulcanizates are resistant to nitrogen tetroxide. No other known expoxy curative yields vulcanizates which are resistant to nitrogen tetroxide.

It is therefore an object of this invention to provide a method for curing carboxy-nitroso terpolymer.

A further object of this invention is to provide novel elastomers having resistance to nitrogen tetroxide.

These and other objects are attained in accordance with this invention by adding a minor portion of dicyclopentadiene dioxide to $CF_3NO/ON(CF_2)_3COOH/C_2F_4$ terpolymer, blending the mixture in a conventional roll-type rubber mill and then curing the mixture by heating it in an oven or, when a particular shape is required, molding in a heated press. It has also been found desirable to incorporate fillers in the formulation, such as a semi-reinforcing carbon black or a silicone oil-coated silica. Detailed procedures for preparing such compounds are given in the following specific examples.

Example I

To 100 parts of $CF_3NO/ON(CF_2)_3COOH/C_2F_4$, mole ratio 48.4/1.6/50, were added 20 parts of a semi-reinforcing carbon black, Furnex SRF, and 1 part of dicyclopentadiene dioxide. The mixture was blended in a laboratory size roll mill and then cured in a press at 200° F. for sixty minutes. The elastomer was postcured at 200° F. for 2 hours, at 225° F. for 2 hours, at 250° F. for 60 minutes, and at 300° F. for 60 minutes.

The cured elastomer has 650 p.s.i. tensile strength, 125% elongation, and its hardness measured 60 on the Shore A Hardness Scale. After immersion in nitrogen tetroxide at 165° F. for 21 days the tensile strength of the elastomer was 600 p.s.i., its elongation was 475%, its 200% modulus was 300 p.s.i., and its Shore A hardness was 50.

Example II

The blending procedure of Example I was repeated except that the amount of dicyclopentadiene dioxide was doubled. The elastomer was cured 60 minutes at 225° F., 45 minutes at 225° F., and postcured 75 minutes at 225° F., 60 minutes at 250° F. and 60 minutes at 300° F. The cured elastomer has 750 p.s.i. tensile strength, 150% elongation, and 65 Shore A hardness. After immersion in nitrogen tetroxide at 165° F. for 60 days, it had 500 p.s.i. tensile strength, 250% elongation, a 200% modulus of 490 p.s.i., and Shore A hardness of 55.

Example III

To 100 parts of the same carboxyl-nitroso terpolymer used in Examples I and II were added 20 parts of a silica having 10% by weight silicone oil dispersed on its surface (Silstone 110, Stoner Rubber Company), and 2 parts of dicyclopentadiene dioxide. The mixture was intimately blended and then cured 60 minutes at 200° F. and 60 minutes at 225° F., followed by postcure of 2 hours at 225° F. and 3 hours at 250° F. The original properties of the elastomer were 710 p.s.i. tensile strength, 175% elongation, and 75 Shore A hardness. After 14 days immersion in nitrogen tetroxide the properties of the elastomer were 720 p.s.i. tensile strength, 250% elongation, and 75 Shore A hardness.

The invention is not limited to the particular forms disclosed herein, and these are to be regarded as illustrative only. For example, the mole percentage of acid termonomer may be varied between 0.01 and 50.0, the trifluoronitroso methane between 49.99 and 0, the tetrafluoroethylene being held at 50 percent.

What is claimed is:

1. A nitrogen tetroxide resistant elastomer comprising a curable carboxynitroso terpolymer of a termonomer mixture comprising between 0.01 and 50 mole percent of gamma-nitroso-perfluorobutyric acid, between 49.99 and 0 mole percent of trifluoronitroso methane and about 50 mole percent of tetrafluoroethylene cured with a curing amount of curing agent consisting essentially of dicyclopentadiene dioxide.

2. The elastomer of claim 1 comprising a filler.

3. An elastomer as defined in claim 2 wherein said filter is a semireinforcing carbon black.

4. An elastomer as defined in claim 2 wherein said filler is a silica coated with about 10% by weight silicone oil.

5. An elastomer as defined in claim 2 comprising about 100 parts by weight of said carboxy-nitroso terpolymer, about 20 parts by weight of said filler, and about 1 to 2 parts by weight of said dicyclopentadiene dioxide.

6. An elastomer as defined in claim 5 wherein said filler is a semireinforcing carbon black.

7. An elastomer as defined in claim 5 wherein said filler is a silica coated with about 10% by weight silicone oil.

8. A nitrogen tetroxide resistant shaped body comprising the elastomer of claim 1.

9. A nitrogen tetroxide resistant shaped body comprising the elastomer of claim 2.

References Cited

UNITED STATES PATENTS 3,282,884　11/1966　Green et al. _____ 260—92.1
3,321,454　5/1967　Crawford et al. _____ 260—92.1

MORRIS LIEBMAN, *Primary Examiner.*

SAMUEL L. FOX, *Assistant Examiner.*

U.S. Cl. X.R.

260—92.1, 836